Nov. 2, 1954   C. O. MYER   2,693,027
METHOD OF MAKING HOLLOW METAL DOORS
Original Filed March 19, 1947   3 Sheets-Sheet 1

Inventor
Charles O. Myer
By Frease and Bisley
Attorneys

Nov. 2, 1954 C. O. MYER 2,693,027
METHOD OF MAKING HOLLOW METAL DOORS
Original Filed March 19, 1947 3 Sheets-Sheet 2

Inventor
Charles O. Myer
By
Attorneys

Nov. 2, 1954 C. O. MYER 2,693,027
METHOD OF MAKING HOLLOW METAL DOORS
Original Filed March 19, 1947 3 Sheets-Sheet 3

Inventor
Charles O. Myer
By
Frease and Bishop Attorneys

2,693,027

Patented Nov. 2, 1954

2,693,027

METHOD OF MAKING HOLLOW METAL DOORS

Charles O. Myer, Warren, Ohio, assignor to Mullins Manufacturing Corporation, Salem, Ohio, a corporation of New York Original application March 19, 1947, Serial No. 735,603. Divided and this application November 1, 1950, Serial No. 193,354

2 Claims. (Cl. 29—446)

The invention relates to sheet metal drawer head and door construction, and more particularly to the construction of a stiff, rigid, double-panel, sound-deadened drawer head or door formed of light gauge sheet metal; and this application is a division of my co-pending application, Serial No. 735,603, filed March 19, 1947, for Sheet Metal Drawer Head Construction, now Patent No. 2,556,099.

Present day kitchens are equipped with base cabinets, wall cabinets and undersink cabinets. The wall cabinets ordinarily are provided with one or more doors and the base and undersink cabinets may be provided with doors or drawers or both. Large numbers of such cabinets are made of light gauge sheet metal, usually sheet steel, and the drawer heads and doors are fabricated to have a box-like double panel construction provided with a flush outer panel wall, an inner panel wall, and narrow top, bottom and edge walls.

The cabinets and their drawers and doors are provided with painted surfaces, usually but not necessarily white; and handles ordinarily are secured to each drawer head and door.

The box-like drawer head or door structure should be stiff and rigid so that the structure and the outer and inner panel walls thereof will not flex, warp, weave, twist, spring or bow convexly or concavely in use upon normally opening or closing the drawer or door or upon pulling or pushing a handle secured thereto even though the drawer or door is made of light gauge sheet metal. Further, the outer surface of the door should be free of weld marks, bolt heads, rivets, etc., so as to present an attractive appearance.

Ordinarily, such drawer heads or doors are fabricated of two sheet steel members with edge flanges telescoped one within another so that the top, bottom and edge walls of the box-like structure are formed of double thickness metal. However, the inner and outer panel walls of the box-like structure each comprise only a single thickness of metal of considerable area. The two members may be assembled by bent tongues, but they are ordinarily welded to provide a more rigid structure.

Such a box-like structure by its very construction, which includes thin single metal thickness panel walls, is drum-like and produces a sharp, high-pitched metallic sound when struck, which is objectionable.

Considerable difficulty has been experienced in the art in attempts to find a satisfactory solution to the problem and to provide a stiff and rigid, sound-deadened light gauge sheet metal drawer head or door structure. Many types and kinds of sound deadening material have been used. The cavity or a portion thereof between the inner and outer panels has been filled with sound deadening material such as pressed pulp insulation board or corrugated paper pads; or one or both inner panel surfaces has been coated with mastic asphalt. However, such sound deadening means, while more or less satisfactory for sound deadening purposes, do not aid in providing a more rigid structure and create new difficulties in assembling or painting operations.

Thus, asphalt material containing solvents, unless dry, within a box-like structure when being welded for assembly gives off gases which may explode from the heat of welding.

However, it is impractical under production methods to use a long drying step in the production line assembly of cabinet doors and the like for drying inner asphalt coated surfaces of a metal box-like structure.

Moreover, the surfaces of a completely assembled metal door or drawer structure must be cleaned or otherwise prepared for painting as a final step immediately preceding painting, preferably by dipping in various kinds of liquid cleaning or treating baths. Paper, pulp board and the like contained within a box-like metallic structure will absorb the liquid of the treating bath. It is practically impossible to completely dry paper or pulp board within an assembled box-like metal structure and to rid the same of the last remnants of the liquid cleaning reagent which may be acid. The presence of even small quantities of the cleaning or treating liquid within the paper, pulp board and the like may prevent a complete bake-out of the paint film.

Various types and kinds of metal spacer clips also have been provided between the inner panel surfaces of box-like drawer head and door structures but such means have usually been secured to at least one of the panel members by spot welding which mars the appearance of the finished article unless extensive metal surface finishing operations are carried out. These metal finishing operations are so costly that they are not feasible in the commercial production of sheet metal cabinets. Moreover, such metal clip means function only as spacer members and do not increase the stiffness and rigidity of the box-like structure to any substantial degree, and do not aid in sound deadening.

In other words, all prior art constructions are subject to or introduce one or more difficulties and do not provide the desired stiffness, rigidity and sound deadening characteristics in the construction of light gauge box-like drawer head and door structures. Apparently, there has been no satisfactory solution to the problems presented prior to the present invention.

Accordingly, it is a primary object of the present invention to improve the construction of light gauge sheet metal drawer head and door structures.

Furthermore, it is an object of the present invention to provide a new box-like double panel light gauge sheet metal drawer head or door structure which has such rigidity and stiffness that it will not flex, warp, weave, twist, spring or bow in normal use, without the use of any metal clips or spacer members inserted between or secured to the inner or outer panel members of the structure.

Also, it is an object of the present invention to provide a new box-like double panel light gauge sheet metal drawer head or door structure having sound deadening means which has excellent sound deadening characteristics without creating difficulties due to the presence of the sound deadening means in assembling the structure by welding or in the subsequent cleaning and painting of the assembled structure.

Moreover, it is an object of the present invention to provide a new stiff, rigid, sound-deadened drawer head or door structure which may be fabricated in accordance with production methods at a minimum cost.

Furthermore, it is an object of the present invention to provide a new box-like double panel light gauge sheet metal drawer head or door structure in which a substantial portion of the panel area of the inner panel is held in pressure abutting relation against the outer panel with sound deadening material means compressed therebetween so as to provide a stiff and rigid assembled structure in which the compressed sound deadening material cannot absorb liquid reagents used in cleaning or treating the surfaces of the assembled structure in preparation for painting.

Finally, it is an object of the present invention to provide a new box-like double panel light gauge sheet metal drawer head and door construction for kitchen wall, base and undersink cabinets and the like which avoids prior art difficulties, satisfactorily solves problems existing in the art, and incorporates the foregoing advantages and desiderata in a simple, effective and inexpensive manner.

These and other objects and advantages apparent to those skilled in the art from the following description and claims, may be obtained, the stated results achieved, and the described difficulties overcome, by the devices, constructions, arrangements, combinations, subcombinations, parts, elements, methods, steps, operations, and procedures which comprise the present invention, the nature of which are set forth in the following general statement, preferred embodiments of which—illustrative of the best modes in which applicant has contemplated applying the principles—are set forth in the following description and shown in the drawings, and which are particularly and distinctly pointed out and set forth in the appended claims forming part hereof.

The nature of the improvements in sheet metal drawer head and door construction may be stated in general terms as preferably including a box-like, double panel, light gauge, sheet metal drawer head or door structure having an outer panel member and an inner panel member; the outer panel member comprising a flat rectangular panel wall terminating at its edges in inturned top, bottom, and edge wall flanges; the inner panel member comprising a rectangular panel wall terminating at its edges in outturned top, bottom and edge wall flanges telescoped within the outer panel member top, bottom and edge wall flanges, said inner panel wall having formed therein a deep drawn outwardly recessed panel portion comprising a major portion of the width and height of the inner panel wall; said recessed panel portion having a depth such that when the inner and outer panel members are telescopically assembled, the recessed panel portion is located closely adjacent said outer panel wall with slight clearance space therebetween; a sheet of compressible, waterproofed, waffled or felted paper sound insulation material interposed and compressed between said recessed panel portion and said outer panel wall; said sound insulation material sheet in uncompressed normal condition having a thickness greater than that of said slight clearance space; and means joining said inner and outer panel members together, holding said recessed panel portion and said outer panel wall in pressure abutting relation and holding said sound insulation material sheet compressed therebetween.

The nature of the improvements in methods of making rigid, sound insulated, box-like, double panel, light gauge sheet metal drawer head or door structures may be stated in general terms as preferably including forming a flanged outer panel member, forming a flanged inner panel member, drawing a recessed panel portion in the inner panel member, applying and preferably cementing a sheet of compressible, waterproofed, waffled or felted paper sound insulation material to the entire inner area of said recessed panel portion, telescoping the flanges of said outer panel member with respect to the flanges of the inner panel member, pressing the outer panel member against the recessed panel portion of the inner panel member to compress the sound insulation material sheet therebetween; and, while maintaining said members pressed together, rigidly securing said panel members together, as by welding, to hold the outer panel member in pressure abutting relation against the recessed panel portion of said inner panel member with said sound insulation material sheet compressed therebetween.

By way of example, preferred embodiments of, and methods of making, the improved sheet metal drawer head and door structures are illustrated in the accompanying drawings forming part hereof wherein.

Similar numerals refer to similar parts throughout the various figures of the drawings.

Figure 1:
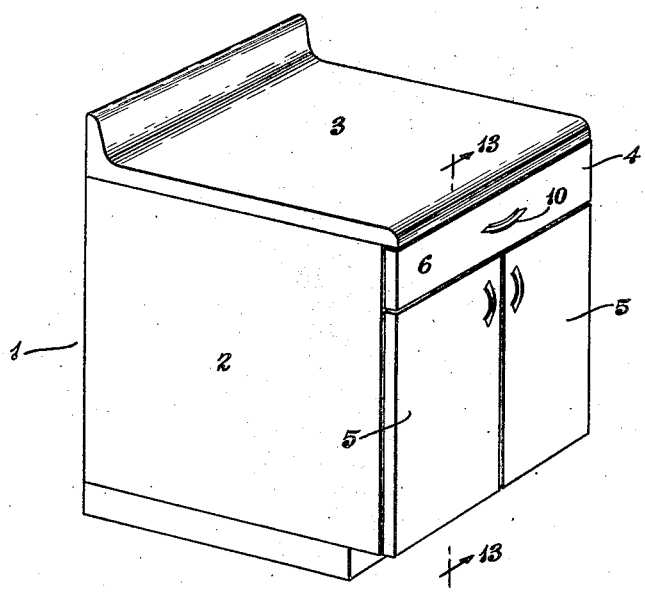
Figure 1 is a perspective view of a base cabinet having a drawer and doors each provided with the improved construction.

A kitchen cabinet is indicated generally at 1 in Fig. 1 having a cabinet portion 2, a top portion 3, a drawer indicated generally at 4, and doors indicated generally at 5. Referring to Figs. 1 through 11, the drawer 4 is provided with a drawer head 6 of the improved construction to which a drawer body 7 is secured in any usual manner. The drawer head 6 is composed of an outer panel member 8, an inner panel member 9, and a handle 10. The outer and inner panel members may each be formed of light gauge sheet metal such as 24 to 22 gauge sheet steel.

Figure 4:
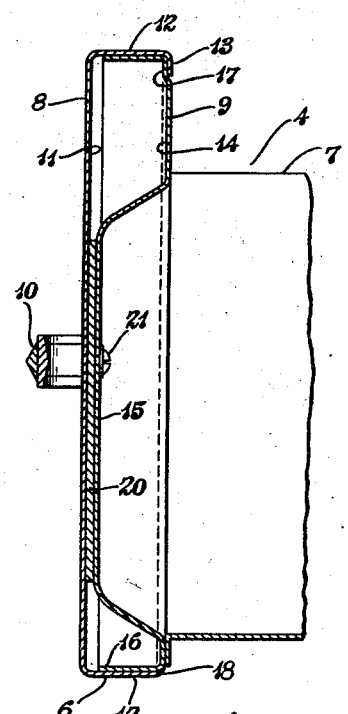
Fig. 4 is an enlarged section looking in the direction of the arrows 4—4, Fig. 3.
Figure 2:
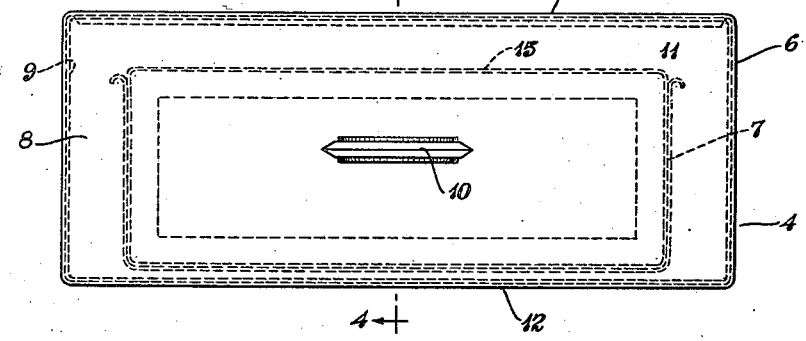
Fig. 2 is a front elevation of the drawer head of the drawer of the cabinet illustrated in Fig. 1.
Figure 3:
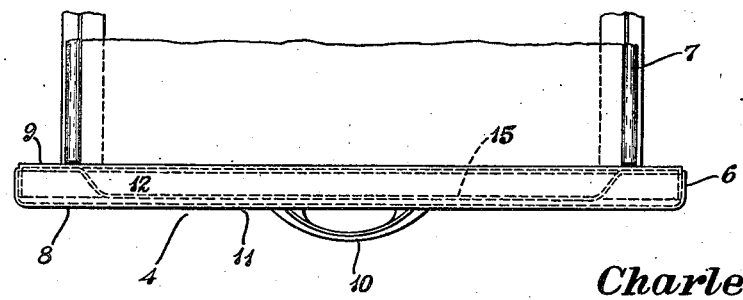
Fig. 3 is a fragmentary plan view of the drawer illustrated in Fig. 2.
Figure 8:
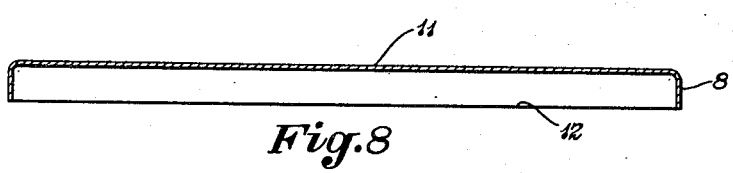
Fig. 8 is a transverse section through the outer panel member illustrated in Fig. 7.

Referring to Figs. 4 and 8, the outer panel member 8 is formed with a flat rectangular panel wall 11 terminating at its edges in inturned flanges 12, the upper flange 12 preferably terminating in a downturned flange 13 (Fig. 4).

Figure 5:
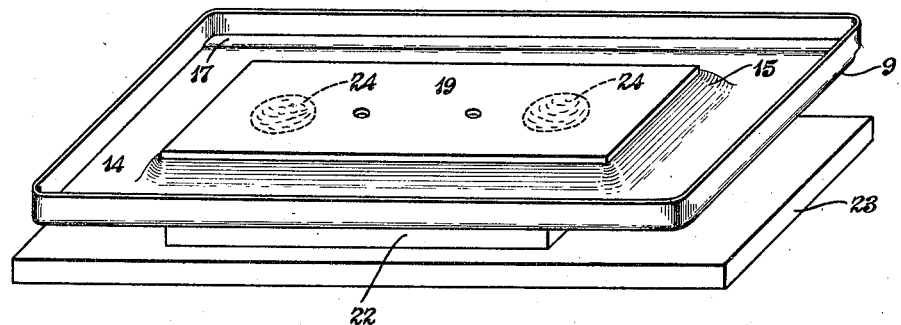
Fig. 5 is a diagrammatic perspective view of the inner panel member of the drawer head of Fig. 2 placed on an assembly table with adhesive material applied to the inner surface of the recessed panel portion thereof and with a sheet of sound insulation material cemented thereto.
Figure 10:
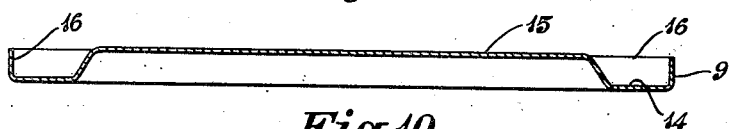
Fig. 10 is a transverse section through the inner panel member illustrated in Fig. 5.
Figure 11:
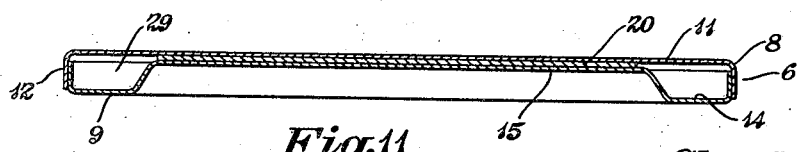
Fig. 11 is a transverse section through the assembled drawer head structure comprised of the parts illustrated in Figs. 8, 9 and 10.

Referring to Figs. 4, 5 and 10, the inner panel member 9 is formed with a panel wall 14 which is formed throughout the major portion of its height and width with a recessed preferably rectangular panel portion 15; and inner panel wall 14 terminates at its edges in outturned flanges 16.

The panel wall 14 is preferably embossed at 17 to receive the downturned flange 13 of the outer panel member 8 when the flanges 16 of the inner panel member 9 are telescoped within the flanges 12 of the outer panel member 8.

Figure 7:
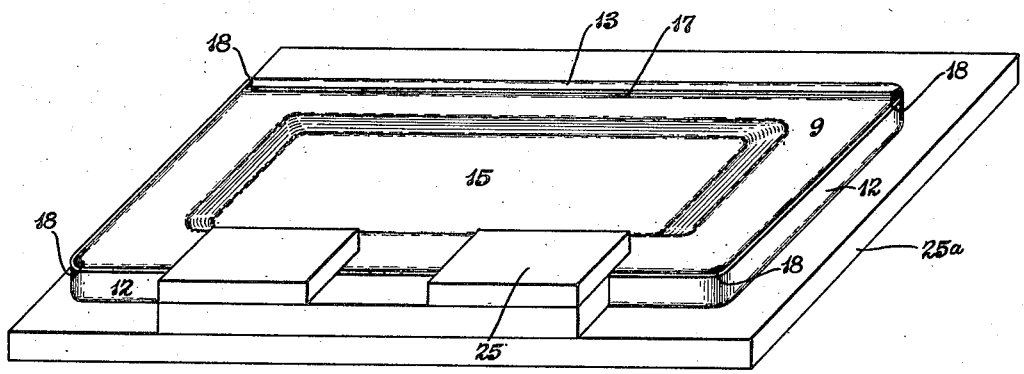
Fig. 7 is a view similar to Figs. 5 and 6 illustrating the outer panel member of the improved drawer head construction completely assembled with the inner panel member and held in pressure abutting relation to compress the sound insulation material sheet while the panel members are being secured together, as by welding.

The members 8 and 9 are assembled and maintained in rigid assembled condition by the cooperative engagement of the flange 13 and embossed portion 17, and by tack welding the lower inner corners of the flanges 12 of the outer panel member 8 to the lower inner corners of the inner panel member 9, as indicated at 18 in Figs. 4 and 7. The telescoped flanges 12 and 16, when assembled, form the top, bottom, and side edge walls of the hollow sheet metal drawer head panel structure 6, and these edge walls hold the panel walls 11 and 14 in spaced apart relation, as shown. Likewise, when assembled, the recessed panel portion 15 formed in the inner panel wall 14 is located substantially at the same depth as the depth of the top, bottom, and side edge walls formed by the flanges 12 and 16, except for the slight clearance space provided between the panel portion 15 and outer panel wall 11, as shown in Figs. 4, 8, 10, 11, 13, and 14.

Figure 9:
Fig. 9 is a transverse section through the sheet of sound insulation material illustrated in Fig. 5.

Referring to Figs. 4, 5, 6, 9 and 11, a sheet of compressible, waterproofed, waffled or felted paper sound insulation material 19 is interposed and compressed between the outer panel wall 11 of the outer panel member 8 and the recessed portion 15 of the inner panel member 9. The sound insulation sheet 19, being formed of waffled or felted paper, is compressible and its normal thickness is illustrated in Fig. 9, whereas when held under pressure and compressed between the inner and outer panel members, its thickness is reduced to substantially that shown at 20 in Figs. 4 and 11.

The handle 10 may be secured to the drawer head 6 by screws 21 passing through outer panel wall 11, the sound insulation sheet 19, the recessed panel portion 15, and the handle 10.

In assembling the improved drawer head construction, an inner panel member 9 is placed on a pedestal 22 of an assembly table 23 with its inside surface accessible. Spots of adhesive material 24 are applied to the inner surface of the recessed panel portion 15 as illustrated in Fig. 5. A preferably rectangular sheet of compressible, waterproofed, waffled or felted paper sound insulation material 19 is applied to said inner surface of the recessed panel portion 15, and is held thereon by the adhesive cement 24. The sound insulation material sheet 19 covers substantially the entire inner area of the recessed panel portion 15 as illustrated in Fig. 5.

Figure 6:
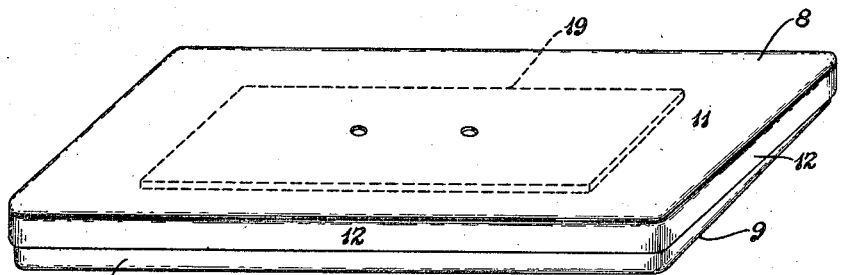
Fig. 6 is a view similar to Fig. 5 showing an outer panel member in the process of assembly therewith.

An outer panel member 8 is then assembled to the inner panel member 9 by telescoping the flanges 12 of the outer panel member over the flanges 16 of the inner panel member as shown in Fig. 6. In performing this operation, the flange 13 of the outer panel member 8 is engaged in the embossed portion 17 of the inner panel member 9 to lock these edges of the members 8 and 9 together. The edges of the two panel members 8 and 9 opposite the locked edge 13—17 are then forced under a height gage bar 25 on a work table 25a with the outer panel member 8 face down on the work table surface. This holds the sound insulation material compressed with the outer panel wall 11 maintained in pressure abutting relation with respect to the recessed panel portion 15, while the inner corners of the flanges of the inner and outer panel members are welded together, as by tack welding, illustrated at 18 in Fig. 7. Thus, no weld marks show on the outer surface of the outer panel member, and no bolt heads or rivets are used or appear on the outer panel surface to mar its appearance.

The drawer head 6 may then have the drawer body 7 assembled thereto in any usual manner; after which the completed drawer 4 may be cleaned and otherwise subjected to surface treatment in final preparation for painting. Such cleaning and surface preparation ordinarily comprises a series of sprays of various reagents followed by spray rinsing and then drying.

Waterproofed, waffled or felted paper sound insulation material is normally waterproof or water repellent even though immersed in water for a considerable period of time. Nevertheless, in its free uncompressed state, some cleaning reagent, particularly acid, may be absorbed in the spaces between the fibers thereof. However, since the sound insulation material sheet 19 is compressed and maintained compressed between the inner and outer panel members 9 and 8, only the peripheral compressed edge thereof is presented to the various sprayed solutions in the cleaning, treating and rinsing operations to which the drawer is subjected. Under such conditions, no liquid will be absorbed by the sound insulation material 19. All liquid drains from the interior of the drawer head and a normal short drying operation completely dries all inner surfaces of the drawer head which have been exposed to the liquid cleaning reagents.

The drawer 4 may then be painted in the usual manner in accordance with production methods without difficulty.

Figure 13:
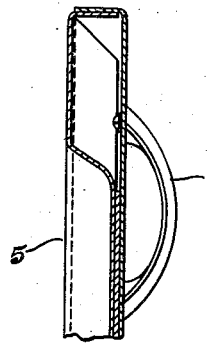
Fig. 13 is a vertical section of a door of a base cabinet, looking in the direction of the arrows 13—13, Fig. 1.

Referring to the base cabinet door 5 illustrated in Figs. 1 and 13, the construction of the same is identical with that of the drawer head 6, except for the relative dimensions thereof and the location of the handle 26 thereon.

Figure 12:
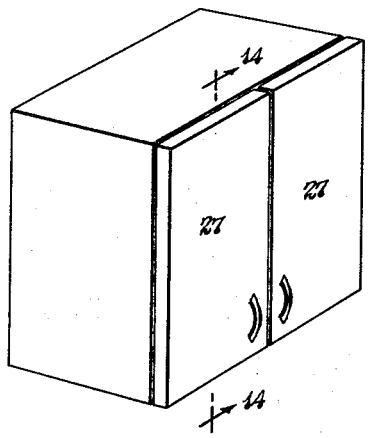
Fig. 12 is a perspective view of a wall cabinet having doors each provided with the improved construction.
Figure 14:
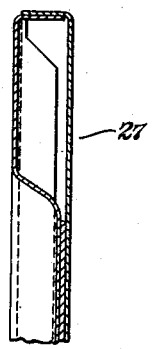
Fig. 14 is a similar sectional view of a door of a wall cabinet, looking in the direction of the arrows 14—14, Fig. 12.

Similarly, the structure of the wall cabinet door 27 illustrated in Figs. 12 and 14 is identical to the structure of the door 5 and the drawer head 6, except for relative dimensions and the location of the handle 28.

The presence of the drawn recessed panel portion 15, occupying a major portion of the width and height of the improved drawer head structure and maintained in pressure abutting relation adjacent the outer panel wall 11 when the members 8 and 9 are permanently assembled together at their flanges, provides an extremely stiff and strong drawer head or door construction, even though the members 8 and 9 are made of light gauge sheet steel, and without the use of bolts, rivets or through welding.

Thus, the improved drawer heads and doors will not flex, warp, weave, twist, spring or bow convexly or concavely in use. Essentially, the edge walls of the drawer heads or doors are formed of two thicknesses of metal. The panel wall likewise is comprised of two thicknesses of metal with sound insulation material compressed therebetween, thereby eliminating the difficulties involved in a construction having spaced single thickness panel walls which are drum-like in character. Furthermore, as indicated at 29 in Fig. 11, the portion of the inner panel wall 14 around the recessed panel portion 15 forms with the edge wall flanges 12 and 16 and outer panel wall 11 a trapezoidally shaped, rectangular, hollow, channel or cavity at the outer periphery of the structure, between the inner and outer panel walls surrounding the recessed panel portion 15, which increases the stiffness and rigidity of the structure.

Furthermore, the sound insulation material 19 held compressed between the pressure abutted panel walls, efficiently deadens the sound produced when the panel wall is struck; so that a dull, soft, thud-like noise is heard rather than the high pitched metallic noise which results when prior art structures are struck.

The compression of the sound insulation material is obtained by proportioning the dimensions of the flanges 12 and 16 of the outer and inner panel members 8 and 9 such that when assembled in the absence of a sound insulation material sheet 19, the inner surface of the recessed panel portion 15 of the inner panel member 9 will lie closely adjacent and parallel to the inner surface of the panel portion 11 of the outer panel member 8 with only a slight clearance space therebetween of less width than the uncompressed thickness of the sound insulation material sheet 19.

Accordingly, the present improvements provide a light gauge sheet metal drawer head or door structure which may be readily fabricated in accordance with production methods at minimum cost to provide a stiff, strong, sound insualted, box-like, double panel, structure composed of only three members, namely, an inner sheet metal panel member, an outer sheet metal panel member rigidly secured to the inner member, and a rectangular sheet of sound insulation material compressed therebetween. Thus, the improved construction avoids the described difficulties heretofore present in prior art constructions.

Although the present improvements have been described in detail with respect to the drawers and doors of kitchen, base and wall cabinets, the improved construction is equally applicable to the fabrication of metal desk drawers and doors, and to the manufacture of metal undersink cabinets and other types of metal equipment and furniture.

In the foregoing description, certain terms have been used for brevity, clearness and understanding; but no limitations are to be implied therefrom beyond the requirements of the prior art, because such words are used for descriptive purposes herein and not for the purpose of limitation and are intended to be broadly construed.

Moreover, the embodiments of the improved structures illustrated and described are by way of example and the scope of the present invention is not limited to the exact details of construction of the various parts.

Thus, sheet metal drawer heads and sheet metal doors have been described and illustrated in detail herein, and the improved structure is hereinafter generically termed "sheet metal drawer head construction," such term including drawer heads, doors, and the like.

Having now described the features of the invention, the manufacture and assembly of preferred embodiments of improved sheet metal drawer head constructions, the preferred steps of making the same, and the advantageous new and useful results attained thereby; the new and useful devices, constructions, arrangements, combinations, subcombinations, parts, elements, methods, steps, operations and procedures, and reasonable mechanical equivalents thereof, obvious to those skilled in the art, are set forth in the appended claims.

I claim:

1. The method of making a rigid, sound insulated, box-like, double panel, light gauge sheet metal drawer head including the steps of forming a sheet metal outer panel member with a continuous integral flange around the four edges thereof, forming a sheet metal inner panel member with a continuous integral flange around the four edges thereof, drawing a recessed panel portion in the flanged inner panel member, cementing a sheet of compressible, waterproofed, waffled paper sound insulation material to the entire inner area of said recessed panel portion, telescoping the continuous integral flanges of said panel members together, pressing the outer panel member toward the recessed panel portion of the inner panel member to compress the sound insulation sheet therebetween, rigidly securing the telescoped flanges of said panel members together while maintaining pressure on the outer panel member toward the recessed panel portion of the inner panel member with said sound insulation material sheet being permanently compressed and fixed therebetween, subjecting said drawer head to liquid surface preparation reagents and drying the same, and then painting the drawer head; whereby the permanent compression of the sound insulation material held between the inner and outer panel members prevents liquid cleaning reagents from being absorbed by the sound insulation material and provides a stiff, rigid, sound insulated drawer head formed of light gauge sheet metal.

2. The method of making a rigid, sound insulated, hollow, light gauge sheet metal drawer head including the steps of forming inner and outer rectangular sheet metal panel member walls, drawing a rectangular recessed panel portion outwardly in the major portion of the width and height of said inner panel member wall, positioning a sheet of sound insulation material on said recessed panel portion between said inner and outer panel walls, pressing the recessed panel portion and said outer panel member wall toward each other with said sheet therebetween, rigidly securing said panel member walls together while maintaining said recessed panel portion and said outer panel member wall pressed toward each other to hold said sound insulation material sheet under permanent compression therebetween with the remainder of the inner panel member wall around said recessed portion spaced from the outer panel wall, thereby forming a hollow cavity between the inner and outer panel walls surrounding said recessed portion and the outer edge of said compressed sheet; spray cleaning and surface treating the surfaces of the assembled structure with liquid reagents in preparation for painting; draining the liquid reagents from the surfaces of the assembled structure; drying the assembled structure; and then painting the assembled, cleaned structure.

References Cited in the file of this patent

UNITED STATES PATENTS

| Number | Name | Date |
|---|---|---|
| 1,898,417 | Woehler | Feb. 21, 1933 |
| 2,253,384 | Lown et al. | Aug. 19, 1941 |
| 2,359,088 | Croft | Sept. 26, 1944 |
| 2,484,310 | Phillipp | Oct. 11, 1949 |
| 2,556,099 | Myer | June 5, 1951 |